United States Patent [19]

Bingaman

[11] Patent Number: 4,470,084
[45] Date of Patent: Sep. 4, 1984

[54] STABILIZED BIAS SYSTEM FOR MAGNETIC TAPE READ AND WRITE HEADS

[75] Inventor: Barrett P. Bingaman, Burbank, Calif.

[73] Assignee: Cetec Corporation, El Monte, Calif.

[21] Appl. No.: 402,771

[22] Filed: Jul. 28, 1982

[51] Int. Cl.³ ............................ G11B 5/86; G11B 5/47
[52] U.S. Cl. .......................................... 360/15; 360/66
[58] Field of Search ...................... 360/15, 66; 369/49, 369/84

[56] References Cited

U.S. PATENT DOCUMENTS

| 3,789,159 | 1/1974 | Feit et al. | 360/15 |
| 3,805,284 | 4/1974 | Coon, Jr. et al. | 360/15 |
| 4,375,655 | 3/1983 | Korth et al. | 360/15 |

Primary Examiner—Vincent P. Canney
Attorney, Agent, or Firm—Harris, Kern, Wallen & Tinsley

[57] ABSTRACT

A bias system for high speed tape recorders, typically comprising a master reproducer and several slave recorders with each slave recorder having four recording amplifiers for driving the four heads of a four-track recorder. The master reproducer includes a high frequency oscillator with an amplitude control, a stable dc source with an amplitude control, and a summing network for combining the ac and dc signals to produce a master control signal for each of the slave recorders. Each slave recorder includes a separator for receiving the master control signal and producing a dc signal and a high frequency ac signal. The dc signal is connected to each recorder amplifier for controlling the amplitude of the ac bias to the head. The ac signal is used to synchronize the high frequency bias ac from the bias generator, which is combined with the audio information signal at each recorder amplifier and then connected to the record head. Preferably each recorder amplifier is also provided with an independent amplitude control for matching the recorder amplifier to the particular record head.

9 Claims, 1 Drawing Figure

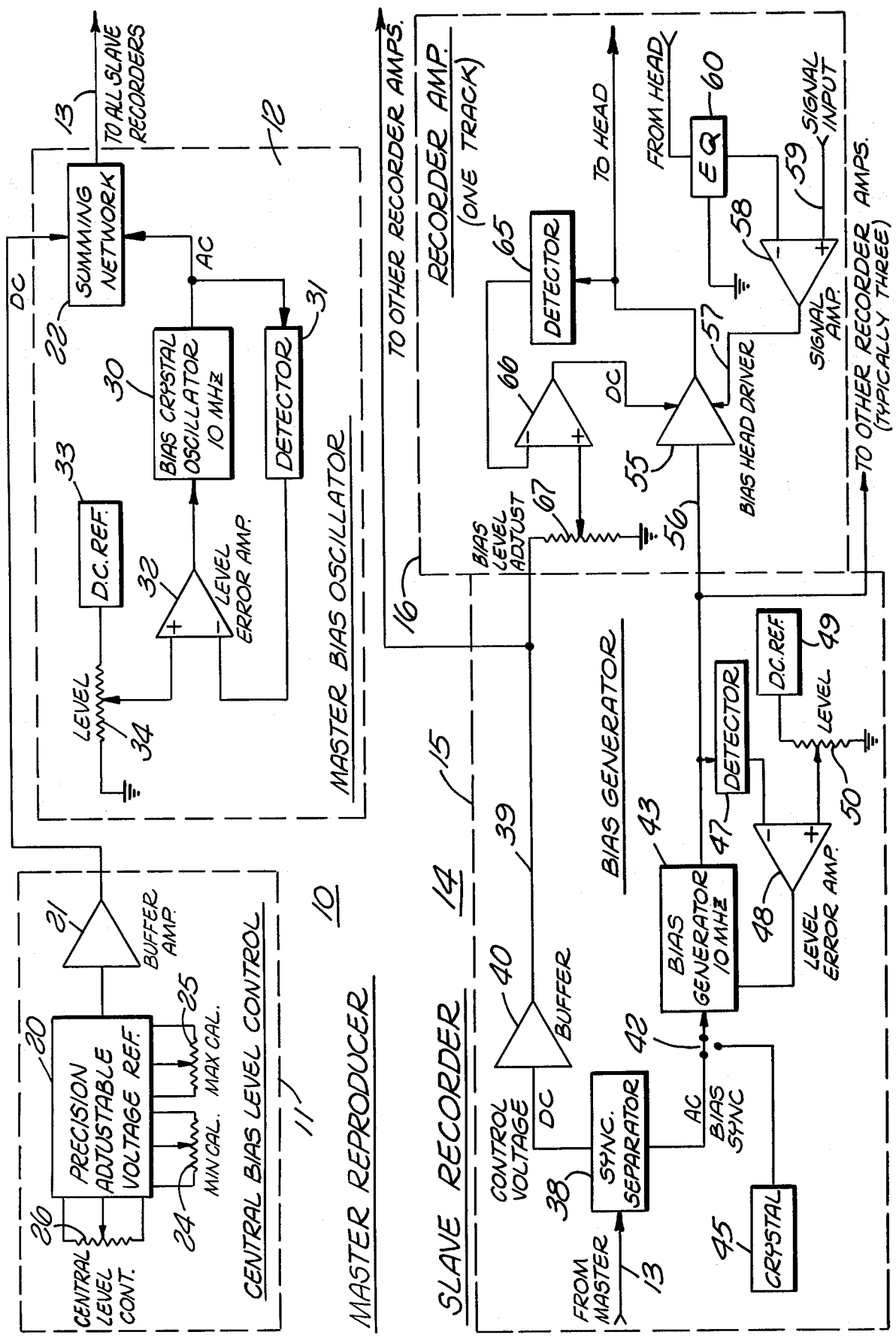

STABILIZED BIAS SYSTEM FOR MAGNETIC TAPE READ AND WRITE HEADS

BACKGROUND OF THE INVENTION

This invention relates to high speed tape recorders and in particular, to a new and improved bias system for tape duplicating equipment.

In a tape duplicating operation, a master tape will be driven past a plurality of read heads and the signals from the reproduce heads will be transmitted to the corresponding record heads of each of a plurality of slave recorders operated in parallel. The entire system will operate at high speeds, typically 240 inches per second. The high speed operation and the utilization of a large number of slave recorders in parallel is essential for economic production of magnetic tape cartridges and cassettes. Control of various parameters of the master reproducer and the slave recorders, including electrical, magnetic and mechanical characteristics, is highly desirable.

In the recording operation, a high frequency bias signal is combined with the audio frequency information signal at each record head. It is highly desirable that the frequency of this bias signal be maintained constant and that the amplitude of the high frequency bias signal be maintained constant and also be adjustable, since different bias levels are preferred for different tapes and recording conditions, as well as for individual record heads. In the past, bias level has been provided by use of stable amplifiers, but these have not always been satisfactory, particularly with changes in temperature and passage of time. Also, when the bias level is set for each individual slave recorder and each individual head thereof, changes in bias level desired for changes in tape and/or recording conditions requires individual adjustment of each record circuit.

Accordingly, it is an object of the present invention to provide a new and improved central bias level control system for a plurality of slave recorders in high speed tape duplicating equipment. A further object is to provide such a system wherein the high frequency bias signal amplitude is controlled by high gain feedback circuits. An additional object is to provide such a system wherein the frequency of all bias signals can be controlled by a single oscillator at the master reproducer and whereby the amplitude of all bias signals can be adjusted by a single control at the master reproducer. One further object is to provide such a system wherein the bias amplitude at each individual record head can be individually adjusted, in addition to the overall control provided by the master reproducer.

It is an object of the invention to provide both apparatus and method for accomplishing these purposes. Other objects, advantages, features and results will more fully appear in the course of the following description.

SUMMARY OF THE INVENTION

The apparatus of the invention comprises a bias system for a plurality of high speed tape recorders including a master reproducer and one or more slave recorders. The master reproducer includes means for providing a dc signal and a high frequency ac signal, and a summing network for combining these two signals to provide a master control signal for each of the slave recorders. In its preferred embodiment, the master reproducer includes an adjustable dc source providing the dc signal and a stable oscillator providing the high frequency ac signal, with a feedback loop for the oscillator and an adjustable dc source providing the reference signal for the feedback loop.

The slave recorders preferably are identical and each includes a bias generator and a plurality of recorder amplifiers, typically four recorder amplifiers for recording four tracks simultaneously. The bias generator includes oscillator means, either an oscillator controlled by a crystal or an amplifier for the ac synchronizing signal, and a synchronization separator having the master control signal as an input and providing the ac synchronizing signal to the oscillator means and a dc signal for each of the recorder amplifiers. In the preferred embodiment, the oscillator means in the bias generator incorporates another high gain feedback loop for stabilizing the output level.

Each of the recorder amplifiers includes a driver amplifier for the record head which driver amplifier combines the high frequency ac signal from the bias generator and the audio frequency information signal from the master tape, with the amplitude of the driver amplifier output controlled by another feedback loop having the dc signal from the master reporducer and bias generator as the reference signal. Also, a separate adjustment for the reference signal in the driver amplifier feedback loop is provided for each recorder amplifier.

The invention also includes the method of producing the bias for each of the recorder amplifiers of each of a plurality of slave recorders, with frequency and amplitude controlled from the master reproducer.

BRIEF DESCRIPTION OF THE DRAWING

The single FIGURE of the drawing is an electrical block diagram of a bias system for high speed tape recorders and incorporating the presently preferred embodiment of the invention.

DESCRIPTION OF THE PREFERRED EMBODIMENT

The bias system of the drawing FIGURE includes a master reproducer 10 having a central bias level control 11 and a master bias oscillator 12. The master reproducer provides a master control signal on output line 13, which signal is connected to each of a plurality of slave recorders 14. Each slave recorder includes a bias generator 15 and a plurality of recorder amplifiers 16, typically with four recorder amplifiers for each bias generator.

The central bias level control 11 includes a precision adjustable voltage source 20 which provides a dc signal through a buffer amplifier 21 to a summing network 22. The voltage source 20 may be conventional and typically includes minimum and maximum calibration potentiometers 24, 25, and a central bias level control potentiometer 26. Ordinarily, the calibration potentiometers are set by the manufacturer and the level control potentiometer is set by the operator at the start of a duplicating operation to achieve the bias level desired for that specific operation.

The master bias oscillator includes a stable high frequency ac oscillator circuit with a crystal oscillator 30 and a high gain feedback circuit with a detector 31 and an error amplifier 32, with the detector output providing one input to the error amplifier and with the other input coming from a dc reference source 33 and potentiometer 34. The oscillator 30 typically is operated at ten megahertz, and this high frequency ac output is connected as the other input to the summing network 22. The summing network combines the ac and dc input signals to produce the master control signal on the line 13.

The bias generator 15 includes a synchronization separator 38 which separates the master control signal into a dc component and an ac component. The dc component is connected to an output line 39 through a buffer amplifier 40, with the signal on the line 39 corresponding to the dc signal from the central bias level control 11. The ac component from the separator 38 is connected through a switch 42 to a bias generator oscillator means 43. Typically the oscillator means 43 is another oscillator operating at ten megahertz, with the ac signal from the separator synchronizing this oscillator 43 with the oscillator 30 in the master reproducer. Alternatively, the oscillator means 43 could be an amplifier for the ac signal from the separator 38.

Alternatively, the switch 42 may be used to connect a crystal reference 45 to the oscillator means 43 to provide a stable reference for the oscillator output frequency.

In the embodiment illustrated, a high gain feedback circuit is provided for the oscillator 43 for improved stability. This feedback circuit includes a detector 47, an error amplifier 48, a dc source 49, and a potentiometer 50. The output of the detector 47 and the adjustable arm of the potentiometer 50 provide the inputs to the error amplifier 48, with the potentiometer permitting control of the reference valve for the feedback circuit.

One recorder amplifier 16 for the slave recorder 14 is illustrated in the drawing figure. The recorder amplifier includes a drive amplifier 55 with its output connected to a record head. This amplifier 55 has an ac input on line 56 from the bias generator 15, and another ac input on line 57 from a signal amplifier 58. The audio frequency ac signal from the master tape for the particular record head driven by the recorder amplifier, is provided on line 59 as an input to the signal amplifier 58. The return from the record head is connected through an equalizer circuit 60 as the other input to the signal amplifier.

The amplitude level of the output of the driver amplifier 55 is controlled by another high gain feedback loop including a detector 65 and an error amplifier 66. The dc reference voltage for the error amplifier is provided from the dc signal on line 39 across a potentiometer 67.

In the embodiment illustrated, the master bias oscillator provides a ten megahertz bias synchronizing signal to all slave recorders along with a dc level control signal for bias setting at each slave recorder. The ac synchronizing signal is used to lock each slave recorder bias generator to the master bias oscillator frequency. The dc level control signal from the master reproducer allows any bias level, preset at the master, to automatically set the individual bias at each recorder amplifier to the preset level. Typically the dc level control 26 is a ten-turn potentiometer. This central bias level control feature allows convenience of changes for various tape types.

Each slave recorder has its own bias generator which can be synchronized to the master bias oscillator or operated independently with its own ten megahertz crystal controlled frequency source 45. The output level is stabilized by an independent high gain feedback control loop to minimize level changes due to time and temperature.

In each slave recorder, each track of the tape has its own head driver amplifier whose critical output level is referenced to the master bias level control. Each slave head driver is designed with a high gain dc feedback loop to provide bias level stability that accurately controls gain changes in the driver amplifier due to time and temperature.

The bias head driver amplifier has sufficient output capability to properly bias all current available magnetic tapes, including the chromium and metal tape.

I claim:

1. In a bias system for a plurality of high speed tape recorders, the combination of:
    a master reproducer having
    a first adjustable dc source providing a first dc signal,
    a first oscillator means providing a first high frequency ac signal,
    a first feedback loop for said first oscillator means,
    a second adjustable dc source providing a second dc signal as a reference signal for said first feedback loop, and
    a summing network having said first dc signal and said first ac signal as inputs and providing a master control signal as an output; and
    at least one slave recorder having a bias generator and a plurality of recorder amplifiers,
    said bias generator having
    a second oscillator means providing a second high frequency ac signal,
    a second feedback loop for said second oscillator means,
    a third adjustable dc source providing a third dc signal as a reference signal for said second feedback loop,
    a synchronization separator having said master control signal as an input and providing as outputs a fourth dc signal corresponding to said first dc signal and a third ac signal corresponding to said first ac signal, and
    means for connecting said third ac signal to said second oscillator means for synchronizing said second ac signal with said first ac signal; and
    each of said recorder amplifiers having
    a driver amplifier having two ac inputs and an amplitude control input, and providing a fourth ac signal as an output to a record head, with said second ac signal connected as one of said ac inputs,
    a third feedback loop for said driver amplifier,
    a fourth adjustable dc source providing a fifth dc signal as a reference signal for said third feedback loop, with said fourth dc signal connected as the input to said fourth dc source, and
    a signal amplifier having an externally generated audio frequency ac signal as one input and the return from the record head as another input, and providing as an output a sixth ac signal connected as the other ac input to said driver amplifier,
    with said fourth ac signal comprising a combination of an audio information signal and a high frequency bias signal.

2. A bias system as defined in claim 1 including
    a high frequency reference, and
    switch means for selectively connecting said third ac signal and said high frequency reference as a synchronizing input to said second oscillator means.

3. A bias system as defined in claim 1 including a plurality of said slave recorders, with said master control signal connected as an input to the synchronization separator of each of said slave recorders.

4. A bias system as defined in claim 1 wherein said second oscillator means is a high frequency oscillator with its frequency synchronized by said third ac signal.

5. A bias system as defined in claim 1 wherein said second oscillator means is a high frequency amplifier for said third ac signal.

6. In a bias system for a plurality of high speed tape recorders, the combination of:
a master reproducer having
first means providing a first dc signal,
first oscillator means providing a first high frequency ac signal, and
a summing network having said first dc signal and said first ac signal as inputs and providing a master control signal as an output; and
at least one slave recorder having a bias generator and a plurality of recorder amplifiers,
said bias generator having
second oscillator means providing a second high frequency ac signal,
a synchronization separator having said master control signal as an input and providing as outputs a second dc signal corresponding to said first dc signal and a third ac signal corresponding to said first ac signal, and
means for connecting said third ac signal to said second oscillator means for synchronizing said second ac signal with said first ac signal; and
each of said recorder amplifiers having
a driver amplifier having two ac inputs and an amplitude control input, and providing a fourth ac signal as an output to a record head, with said second ac signal connected as one of said ac inputs and with an externally generated audio frequency ac signal connected as the other of said ac inputs, and
second means for providing a third dc signal as said amplitude control input to said driver amplifier, with said third dc signal varying as a function of said second dc signal,
with said fourth ac signal comprising a combination of an audio information signal and a high frequency bias signal.

7. A method of producing bias for a plurality of high speed tape recorders, including the steps of:
producing a first adjustable dc signal and a first adjustable high frequency ac signal;
combining the first dc signal and first ac signal to produce a master control signal;
transmitting the master control signal to at least one slave recorder having a plurality of recorder amplifiers,
at the slave recorder, separating the master control signal into a second dc signal corresponding to the first dc signal and a second ac signal corresponding to said first ac signal;
generating a third high frequency ac signal synchronized with the second and first ac signals;
in each of the recorder amplifiers combining the third high frequency ac signal and an externally generated audio frequency ac signal producing a fourth ac signal as an output to a record head; and
controlling the amplitude of the fourth ac signal of all the recorder amplifiers as a function of the second and first dc signals.

8. A method as defined in claim 7 including in each of the recorder amplifiers independently varying the amplitude of the fourth ac signal.

9. A method as defined in claim 7 including selectively controlling the frequency of the third ac signal by the second ac signal and by a separate reference frequency.

* * * * *